(12) United States Patent
Daigle

(10) Patent No.: US 8,266,223 B2
(45) Date of Patent: Sep. 11, 2012

(54) AUTOMATIC DISPLAY OF MESSAGES ON DISPLAY SCREEN

(75) Inventor: Brian Daigle, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1051 days.

(21) Appl. No.: 12/036,613

(22) Filed: Feb. 25, 2008

(65) Prior Publication Data

US 2009/0217365 A1    Aug. 27, 2009

(51) Int. Cl.
*G06F 15/16*    (2006.01)
*H04N 7/10*    (2006.01)

(52) U.S. Cl. ............................... 709/206; 726/7; 725/33

(58) Field of Classification Search .................. 709/206; 726/7; 455/466
See application file for complete search history.

(56) References Cited

U.S. PATENT DOCUMENTS

| 5,138,312 | A | 8/1992 | Tsukamoto et al. |
| 5,495,283 | A | 2/1996 | Cowe |
| 5,844,552 | A | 12/1998 | Gaughan et al. |
| 5,953,396 | A | 9/1999 | Kong |
| 7,327,834 | B1 * | 2/2008 | Hiers et al. ................. 379/88.18 |
| 7,721,217 | B2 * | 5/2010 | Bonforte et al. .............. 715/758 |
| 2003/0087665 | A1 * | 5/2003 | Tokkonen ..................... 455/556 |
| 2008/0070609 | A1 * | 3/2008 | Ackley .......................... 455/466 |
| 2008/0263165 | A1 * | 10/2008 | Hui et al. ...................... 709/206 |
| 2008/0307339 | A1 * | 12/2008 | Boro et al. .................... 715/764 |
| 2009/0033472 | A1 * | 2/2009 | Fotuhi ........................ 340/309.7 |
| 2009/0210225 | A1 * | 8/2009 | Simpson et al. .............. 704/235 |

* cited by examiner

*Primary Examiner* — Shirley Zhang

(74) *Attorney, Agent, or Firm* — Cantor Colburn LLP

(57) ABSTRACT

A method, Internet protocol television (IPTV) enabled communication device, and computer program product for automatic message services are provided. A processor executes instructions from a memory. An input and output (I/O) device is for transmitting and receiving, respectively. A client application is stored in the memory and configured to provide the automatic message service. The client application receives input of a message to be presented at an appropriate time, receives input of an action associated with the message, receives input of a recipient for the message, and presents the message for display to the recipient at the appropriate time.

17 Claims, 6 Drawing Sheets

AUTOMATIC DISPLAY OF MESSAGES ON DISPLAY SCREEN

BACKGROUND

Exemplary, embodiments relate generally to the field of network communications, and more particularly, to networks that support Internet protocol television services.

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VoIP). Subscribers receive IPTV services via a set top box that is connected to a television or display device for the reception of a digital signal. Used in conjunction with an IP-based platform, the set top box allows for a subscriber to access IPTV services and any additional services that are integrated within the IPTV service.

IPTV service platforms allow for an increase in the interactive services that can be provided to residential subscribers. As such, a subscriber can have access to a wide variety of content that is available via the IPTV service or the Internet. For example, a subscriber (or user of a subscriber device) may utilize interactive services via a set top box to view IPTV content via an Internet web browser. The IPTV infrastructure also allows the delivery of a variety of video content instantly to the subscribers.

In previous generation cable and satellite based television delivery systems, the subscriber is limited to the content provided by the particular delivery service. It is desirable to personalize the display of content provided on the television.

BRIEF SUMMARY

Exemplary embodiments include an Internet protocol television (IPTV) enabled communication device that provides automatic message service. A processor executes instructions from a memory. A client application is stored in the memory and configured to provide the automatic message service. The client application receives input of a message to be presented at an appropriate time, receives input of an action associated with the message, receives input of a recipient for the message, and presents the message for display to the recipient at the appropriate time.

Additional exemplary embodiments include a method for providing automatic message service for an Internet protocol television (IPTV) enabled communication device. Input of a message to be presented at an appropriate time is received, and input of an action associated with the message is received. Also, input of a recipient to the message is received. The message is presented to the recipient for display at the appropriate time on the communication device.

Further exemplary embodiments include a computer program product, tangibly embodied on a computer readable medium for providing automatic message services for an Internet protocol television (IPTV) enabled communication device. The computer program product includes instructions for causing a computer to execute the method.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with advantages and features, by way of example with reference to the drawings.

DETAILED DESCRIPTION OF EXEMPLARY EMBODIMENTS

Figure 1:
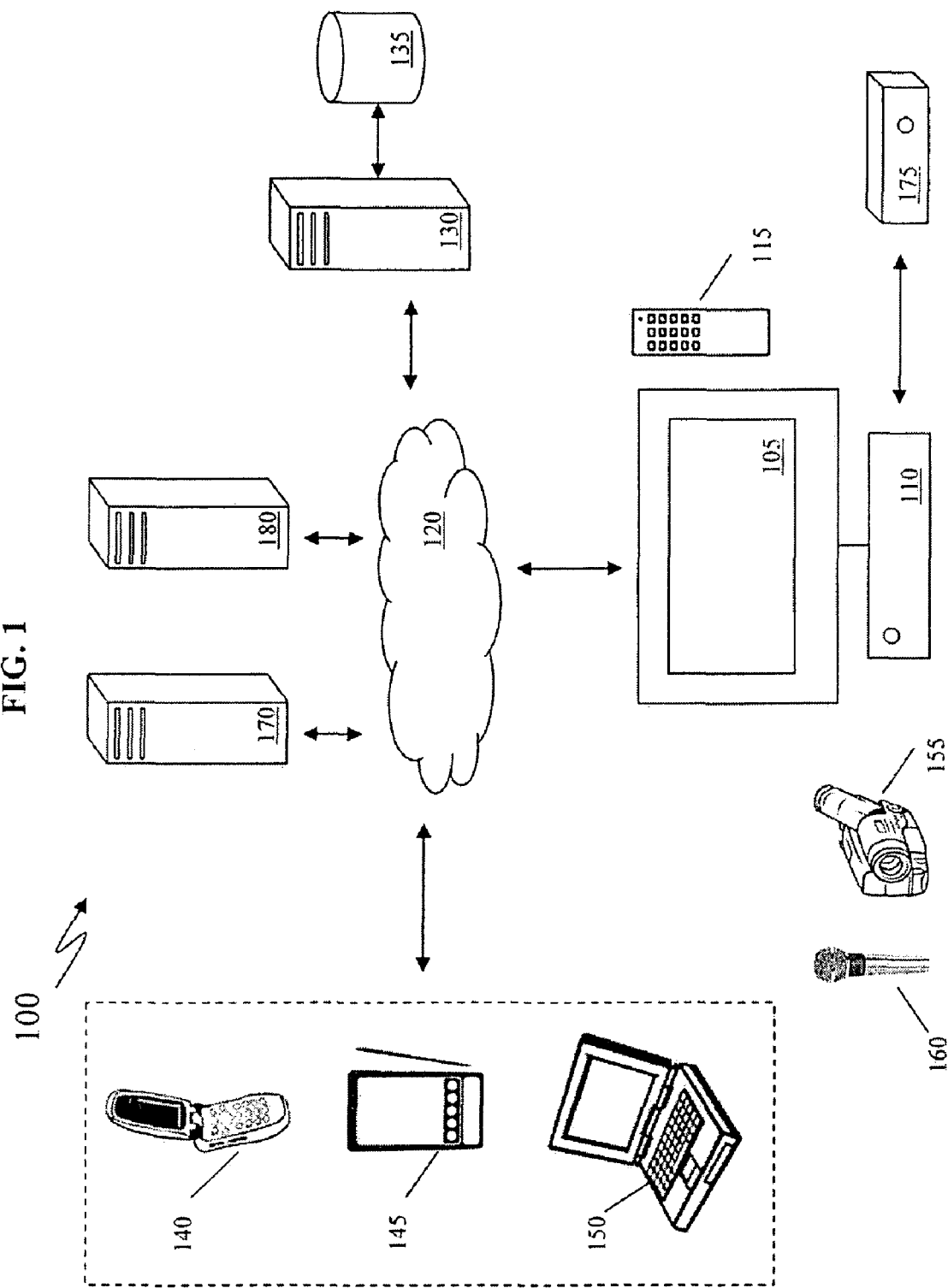
FIG. 1 illustrates a block diagram of a system in accordance with exemplary embodiments.

FIG. 1 illustrates a block diagram of a system 100 in accordance with exemplary embodiments. The system 100 provides an infrastructure through which users can access message services through a communications device 105, such as an IPTV enabled television and a computing device 110, such as a set top box, configuration, or any other type communication device. In exemplary embodiments, the communications device 105 may contain the interworkings of the set top box 110, and the set top box 110 may be omitted. As an IPTV network, the system 100 may also include a remote controller 115 for inputting information and controlling the communications device 105. Also, the system 100 may include a device 175 operatively connected to the set top box 110. The device 175 may be a gaming device for playing video games, an audio device for recording, decoding, and/or playing audio, a digital video recorder for recording and playing back video, or any combination of electronic devices.

The communications device 105 is in communication with a server, such as a server 130 (which may be a back-end server) and a storage 135, via a network 120. The network 120 may include circuit-switched and/or packet-switched technologies and devices, such as routers, switches, hubs, gateways, etc., for facilitating communications between the communications device 105 and networked entities. The network 120 may include wireline and/or wireless components utilizing, e.g., IEEE 802.11 standards for providing over-the-air transmissions of communications. The network 120 can include IP-based networks for communication between a customer service center and clients using the communication device 105 via a broadband connection.

In exemplary embodiments, servers 170 and 180 may be operatively connected to the network 120. Various enterprises or businesses can utilize the servers 170 and 180 to communicate with other networked entities via the network 120.

Figure 6:
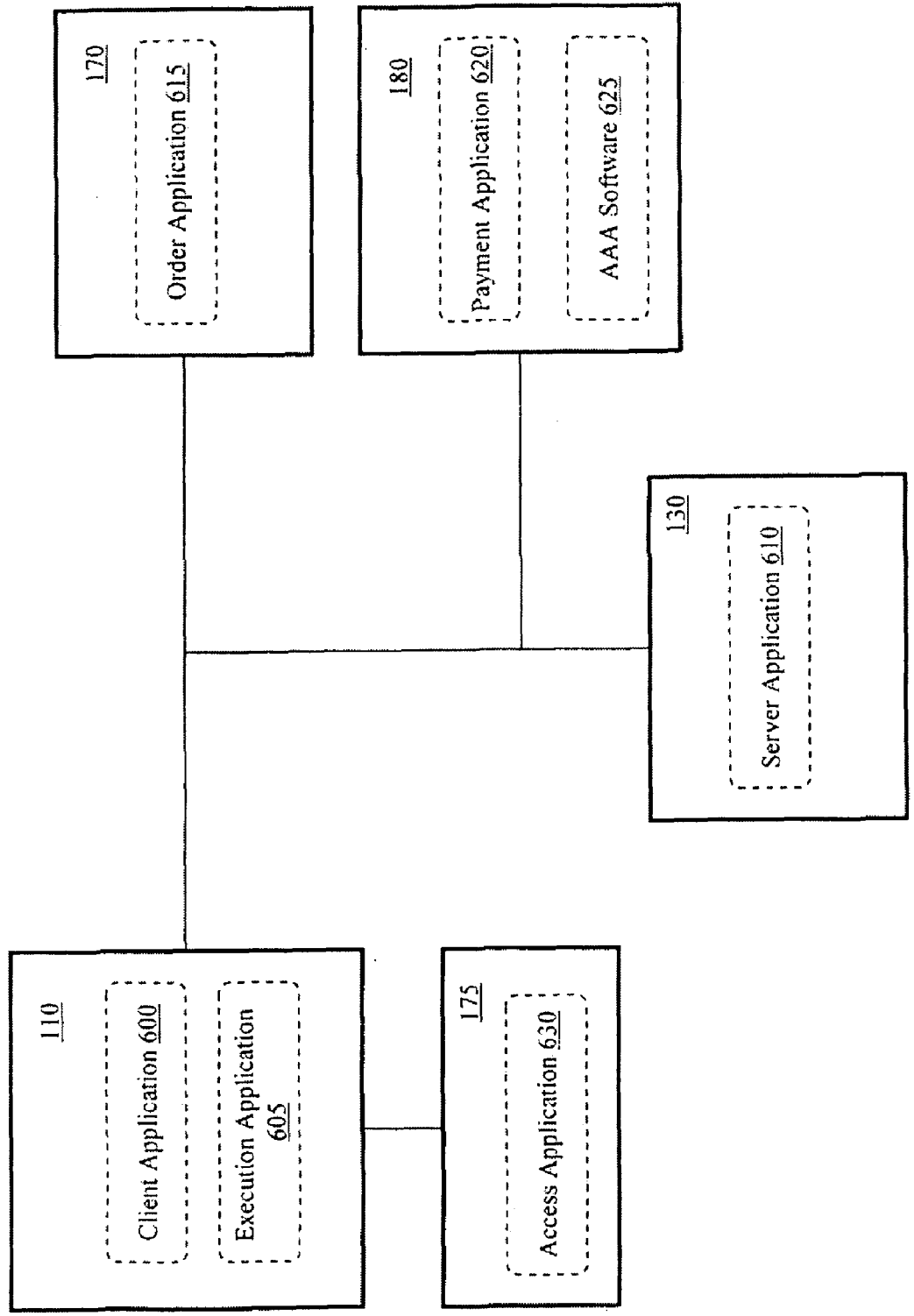
FIG. 6 illustrates a block diagram of operations in accordance with exemplary embodiments.

Referring to FIG. 6, the set top box 110 may include a client application 600 and an execution application 605. The client application 600 provides a suitable user interface for inputting and accessing messages. The messages input by the creator may be coupled to an action that can be executed by the execution application 605.

The execution application 605 is capable of communicating over a wide variety of protocols. The execution application 605 may be configured to communicate with various devices, such as the device 175 (which may be a gaming system, computer system, home theater system, and the like). If a user inputs a message in a user interface of the client application 600, the user may choose to associate an action to the message. The message may be a request to do a task or question. If the recipient reads the message and selects, e.g., OK, the execution application 605 may execute the particular action. For example, when the recipient of the message clicks OK, the user may have input a telephone number to be called, the user may have entered a URL or an IP address to operatively be connected to, or the user may have mapped to a device (e.g., the device 175) or application such that the device or application is enabled or disabled. In response to the recipient selecting OK, the client application 600 can instruct the execution application 605 to perform the associated action that has been set up previously by the user. Also, the execution application 605 can be mapped to various devices and applications in or operatively connected to the set top box 110 (or communications device 105). The execution application 605 can be instructed to input various data in data fields of the applications. Also, the execution application 605 can be instructed to transmit signals to the devices, e.g., to start, to pause, or to shut down.

The server 130 may include a server application 610. The client application 600 of the set top box 110 interacts with the server application 610 in accordance with exemplary embodiments.

The server 170 may, e.g., host services for an enterprise (e.g., a pizza enterprise) so that orders can be placed and paid for via the network 120. The server 170 may include an order application 615 for accepting and confirming (pizza) orders. The server 170 may communicate with the sever 180. Various types of secure payment services may be implemented oil the server 180, such as, e.g., PAYPAL. The server 180 may include a payment application 620 for transacting payments for goods and services. The server 180 may include authentication, authorization, and accounting (AAA) software 625 for handling user requests for access to computer resources and for providing authentication, authorization, and accounting services. The AAA software 625 can allow or deny access to the payment application 620 for payment services on the server 180.

FIG. 6 also includes the device 175. The device 175 may include an access application 630 for allowing or denying access to the device 175. The execution application 605 of the set top box 110 can be set to cause the access application 630 to allow or deny services to the device 175. Also, the execution application 605 can be set to turn off audio and video inputs of the set top box 110, such that the device 175 cannot communicate via the audio and video inputs of the set top box 110.

Referring to FIG. 1, in exemplary embodiments, messages may be stored on the server 130 and the storage 135. Also, messages may be stored on the set top box 110. The messages may be input from a variety of input devices, such as the remote controller 115, a cell phone 140, a personal digital assistant (PDA) 145, a personal computer 150, etc. As a non-limiting example, using the remote controller 115, a mother may use the remote controller 115 to input a message for her son, via the client application 600 of the set top box 110 and the server application 610 of the server 130, so that the son can view the message on the communications device 105. Using the remote controller 115, the mother may input "I am going to be late; order pizza tonight." The user interface of the client application 600 can display an OK button for the son to select, and the son may use the remote controller 115 to select the OK button oil the user interface of the client application 600. In response to selecting OK oil the application 600, the client application 600 may instruct the execution application 605 to call a local pizza restaurant. The telephone number to the pizza restaurant may have been input in the client application 600 by the mother, or the pizza restaurant can be selected from a preexisting list of restaurants input in advance. The execution application 605 can connect the home phone (not shown) to the pizza restaurant via the network 120. The son can place the order for the pizza using the home phone.

Also, in exemplary embodiments, the execution application 605 may operatively connect the set top box 110 with the server 170, in response to selecting OK. In this non-limiting example, the server 170 may represent the local pizza restaurant. The order application 615 of the server 170 can be used for receiving orders (for pizza). The client application 600 can be configured to input the required data for the order application 615. Also, the son can input any data required by the order application 615.

In exemplary embodiments, the order application 615 of the server 170 may have the capabilities to receive payment for the order, such as credit card information or account information. The account information may be for a preexisting account already established with the enterprise hosted by the server 170, which is a pizza restaurant in this non-limiting example.

Also, in exemplary embodiments, payment may be executed using the server 180. The AAA software 625 of the server 180 may verify that the son connected on the set top box 110 has authorization to pay for the pizza. The payment application 620 may receive payment for the pizza. A secure payment may be made, e.g., using a credit card. The credit card information may be accessed by the client application 600 (e.g., the credit card information may be securely stored on memory of the set top box 110 or the server 130). Also, the son may input the credit card information using the remote controller 115.

The mother may input the same or different messages for her daughter, husband, and others in the household. If the mother has permissions, the mother can input messages for others to view that are not in her household, i.e., the mother may input a message for her best friend who lives in another city.

As a non-limiting example, the mother may be given a special code and/or a unique identification of the best friend. With the special code and/or unique identification, the mother can input messages for the best friend in the client application 600 so that the messages can be displayed on the IPTV device (similar to, e.g., the communications device 105) of the best friend in accordance with exemplary embodiments. In exemplary embodiments, a message for the best friend may be input in the client application 600 by the mother, and the client application 600 communicates with the server application 610 to authenticate the special code and/or unique identification and to provide the message to the best friend if authenticated.

In accordance with exemplary embodiments, the mother may input a message in the user interface of the client application 600 that reads, e.g., "You are not going to be able to watch T.V. until you clean your room. After you clean your room, select OK." Using the remote controller 115, the mother can lock access to television programming, of the communications device 105. As a non-limiting example, the client application 600 may instruct the execution application 605 to restrict access to media unless a password is input. In the user interface of the client application 600, the mother can associate the password to restrict access to media on the communications device 105 with the son selecting OK. After the son cleans his room, he may select OK on the user interface of the client application 600. In response to selecting OK, the password is input and the execution application 605 unlocks the communication device 105. Alternatively and/or additionally, the mother may input the password in a parental controls application to lock access to television programming. In response to selecting OK, the execution application 605 opens the parental controls application and inputs the password in the parental control application.

When a message is read using the client application 600 and/or when the action related to the message is executed by the execution application 605, an acknowledgement may be transmitted to the creator of the message (e.g., the mother).

In accordance with exemplary embodiments, a user may input a message "John would you record the super bowl at 8:00" in the client application 600. Since there is no action associated with the message, the client application 600 may parse the message for keywords, such as record, super bowl, and 8:00. The client application 600 may parse a T.V. program listing to determine if the keywords (record, super bowl, and 8:00) can be correlated to a particular program in the program listing. The client application 600 may determine that the super bowl is scheduled to be broadcast on channel ZZZ at 7:30. The client application 600 associates an action to the message and displays "Click OK to record the super bowl at 7:30 on channel ZZZ." If John clicks OK, the execution application 605 causes the device 175 (e.g., a digital video recorder) to record the super bowl. Also, if the set top box 110 has recording capabilities, the execution application 605 can cause the set top box 110 to record the super bowl at 7:30. The client application 600 recognized keywords from the message and provided an action based on the keywords in the message. From parsing the program listing (and metadata), the client application 600 determined that the 8:00 time input by the user was later than the 7:00 time in the program listing scheduled for the super bowl.

In exemplary embodiments, the user may input the following message in the user interface of the client application 600: "John would you record the super bowl at 8:00. Click OK to record." in this non-limiting example, the user has associated the action to the message for the execution application 605 to execute. John can click OK on the client application 600 to record super bowl.

Moreover, it is understood that there are many ways to implement the exemplary embodiments and that illustrations are provided herein for explanatory purposes. Also, it is understood that although non-limiting examples have been provided using certain scenarios (e.g., with a mother), no scenarios are not meant to be limiting in any way.

Figure 2:
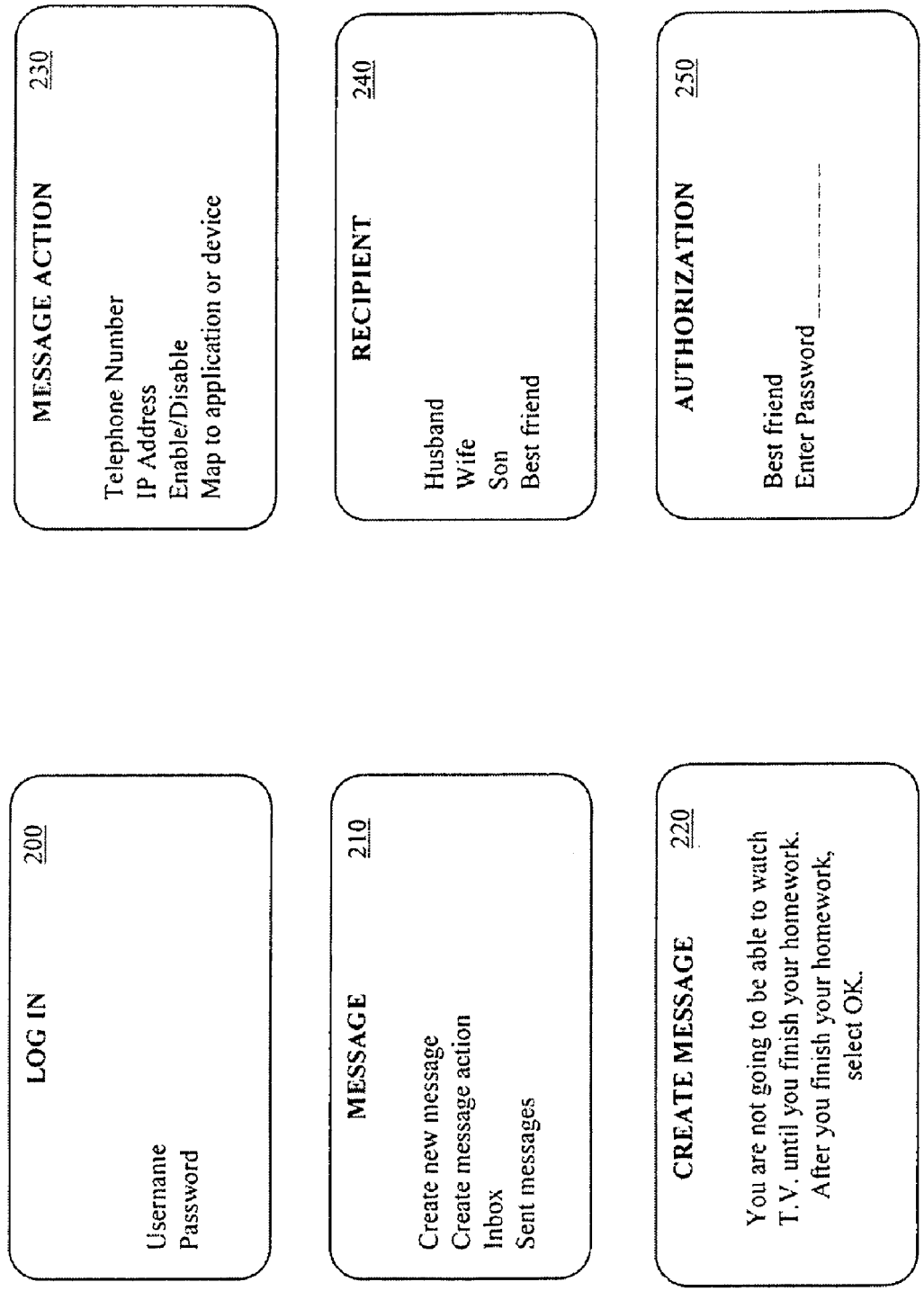
FIG. 2 illustrates non-limiting examples of screens for inputting messages in accordance with exemplary embodiments.

FIG. 2 illustrates non-limiting examples of screens for inputting messages in accordance with exemplary embodiments. When inputting the message in accordance with exemplary embodiments, the user may go to a log in screen 200 and enter, e.g., a username and password. As discussed herein, data may be input using, e.g., the remote controller 115, the cell phone 140, the PDA 145, or the personal computer 150. The user may select a message tab from a menu, and the user may go to a message screen 210 that has a plurality of options for the user, such as creating messages, creating message action, viewing sent messages, viewing new or old messages in an inbox, deleting messages, setting preferences, etc. The user may choose to create a new message and may input the message in a create message screen 220.

The user may select create message action on the message screen 210, because the user may desire to have an action associated with the message. An action message screen 230 may have preexisting selections to choose from, and/or the user may create a particular action to associate with the message in the action message screen 230. The user may desire to map to an application or device, so that the device (or application) can be enabled or disabled by the execution application 605, based on the response by the recipient of the message. Also, the user may input a telephone number in the client application 600 so that a response to the message causes the execution application 605 to call the telephone number.

In exemplary embodiments, the message itself or a response to the message (such as selecting OK) may initiate an action. For example, selecting the OK button of the user interface for the client application 600 may cause the execution application 605 to enable or disable a function, a device (e.g., the device 175), a capability, or the like. Also, the execution application 605 can cause other programs and applications to be initiated. As non-limiting examples, the execution application 605 may cause a television program to be recorded, a telephone call to be placed (e.g., using voice of Internet Protocol (VOIP) or using the PSTN), audio and video (A/V) inputs and outputs to be enabled and/or disabled, an operative connection to servers to be made, and the like. The user interface of the client application 600 allows additional action setting to be added as desired by the user. As a non-limiting example, the client application 600 can be used to cause the execution application 605 to be mapped to various application or devices, such as a theater system, ON-DEMAND programming, gaming systems, recoding systems, 111 addresses, etc.

As a non-limiting example, the user (e.g., the mother) may input the following message in the client application 600: "You are not going to be able to watch T.V. until you finish your homework. After you finish your homework, select OK." In response to selecting OK, the client application 600 may instruct the execution application 605 to input a parental password that allows the communications device 105 to be unlocked so that media can be accessed and/or displayed on the communications device 105.

According to exemplary embodiments, the user also has the option of selecting which recipient that the message is designated for in a recipient screen 240. The user may also input a different name in the recipient screen 240. After designating the recipient, the message can be stored in and/or transferred to the storage 135, the server 130, and/or the set top box 110. The message can be retrieved by the client application 600, interacting with the server application 610, for display on the communications device 105 at the appropriate time.

Further, if the user selects to transmit the message to the best friend, the user may input a password in an authorization screen 250. The authorization screen 250 allows the user to validate that he or she has permission to cause the message to display on, e.g., an IPTV device of the best friend.

In exemplary embodiments, the user desiring to create a message may not have to enter a username and password in the log in screen 200, and the user may be able to select his or her name as the sender from a list of names (similar to the list of names for selecting recipients in the recipient screen 240).

The user has options of when (e.g., what time) the message is going to be displayed in exemplary embodiments. The user may elect to have the message displayed at 3:30 P.M., or the user may elect to have the message displayed as soon as the communications device 105 (e.g., a television) is turned on. The user may elect to have the message displayed on a particular date. The user may have multiple messages for the same person or for different people, and each message can be displayed at its designated time. Moreover the user has many options in setting the time, date, and manner in which messages are to be displayed for a recipient on the communications device 105.

The message may be for one time only, or the message may be recurring. As a non-limiting example, a mother may set a recurring message for her son on Monday through Friday which is displayed on the television as "Don't forget football practice at 3:30, select OK." If the son selects OK, the client applications 600 may instruct the execution application 605 to transmit an acknowledgement message to the mother. Also, if the son does not select OK by 3:15, the client application 605 may instruct the execution application 605 to call the telephone (home phone or son's cell phone) and play a voice message "Don't forget football practice at 3:30, select OK" that has been recorded using a microphone 160.

In accordance with exemplary embodiments, the user has the option of electing various features for the message. As a non-limiting example, the user may choose to have sound with the message, such as alarms, buzzers, music, rings, and the like. The user may also choose to have a particular image (like a picture) associated with the message. For example, messages from a user's mom may have the mom's pictures, and messages from a user's dad may have the dad's picture. Also, if the subject matter of the message is about football, a picture of a football may be associated with the picture by the user.

Additionally, the user may choose to record a video of a message and/or record an audible message. For example, referring back to FIG. 1, a camera 155 (with a built-in microphone) and/or the separate microphone 160 may be utilized by the user to record a message. The client application 600 can capture the video and/or audio message, and the client application 600 stores the message in the set top box 110 or stores the message in the server 130 (or storage 135) by communicating with the server application 610. At the appropriate time, the message may be retrieved by the client application 600 from the set top box 110 or the server 130.

The client application 600 and the server application 610 may be used in implementing exemplary embodiments. As a non-limiting example, when the user desires to use automatic message services (as a sender or recipient), the client application 600 may run in the background such that the various features discussed herein are provided to the user. Additionally, the client application 600 is in communication with the server application 610 for providing automatic message services, e.g., in a client/server architecture. As a non-limiting example, the client application 600 may reside on the set top box 110, the cell phone 140, the PDA 145, and/or the personal computer 150. Alternatively, if memory or processing resources are a concern, the client application 600 may reside on the network 120, and the cell phone 140 or the PDA 145 may access the client application 600 from the network 120. The server application 610 may reside on a back-end server, such as the server 130. The client application 600 and the server application 610 can share the responsibilities for the automatic message services.

Figure 3:
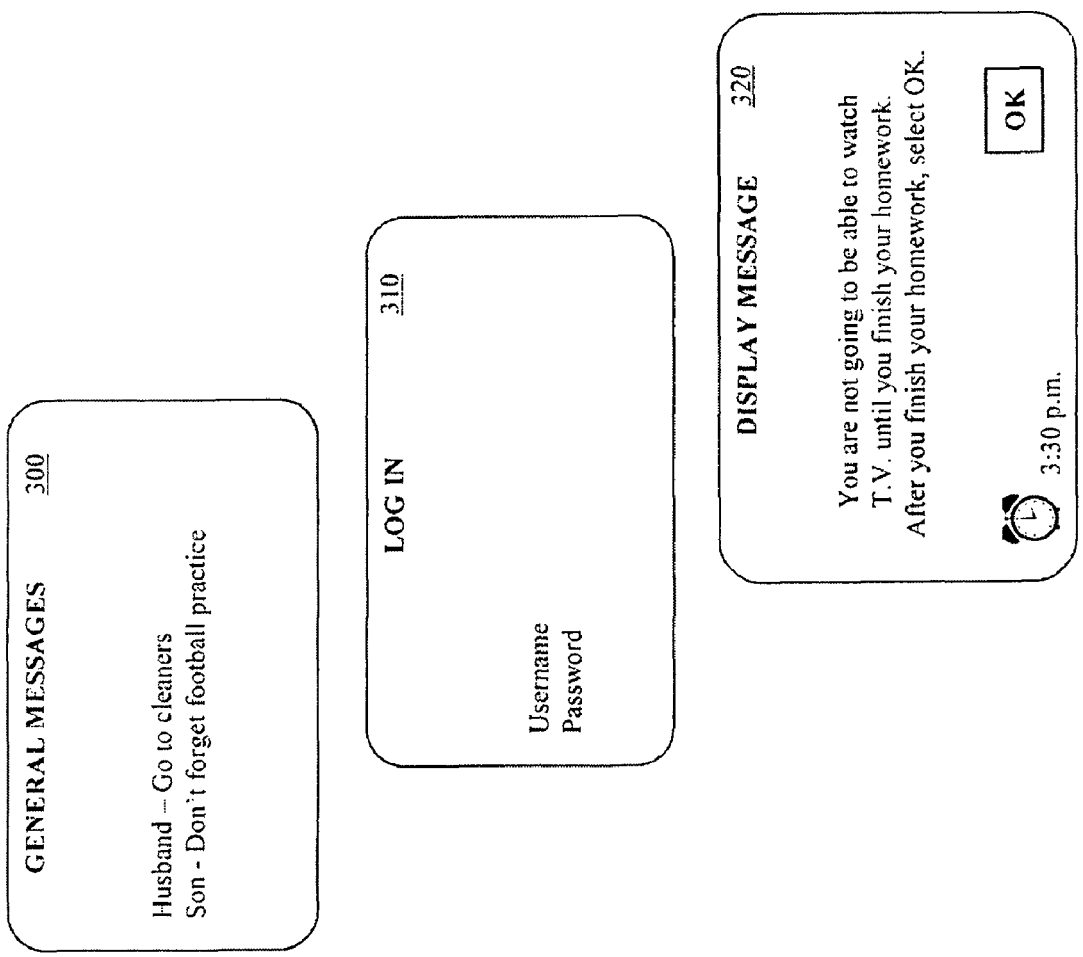
FIG. 3 illustrates non-limiting examples of accessing messages in accordance with exemplary embodiments.

FIG. 3 illustrates non-limiting examples of accessing messages in accordance with exemplary embodiments. As a non-limiting example, the son (coming home from school) may turn on the communications device 105 to access the IPTV network (e.g., the network 120), and general messages for everyone may be displayed on a general message screen 300.

According to exemplary embodiments, there is no restriction to accessing messages in the general message screen 300, and the general message screen 300 may show messages for multiple people, such as the husband, the son, the wife, and others. General messages in the general message screen 300 may be set to display at designated times.

In accordance with exemplary embodiments, the messages may be set to recur over a period of time on certain dates. The messages, e.g. may recur hourly, daily, weekly, monthly, yearly, etc. There may be various sounds associated with the messages, such as alarms, rings, buzzers, music, and the like. Also, the message left by the sender (e.g., the mom) may be a voice message or a video message that can be recorded for display later. As a non-limiting example, the mom can use the camera 155 to record video (or a still picture) to be displayed with a text message (or as a message), or the mom can use the microphone 160 to record an audile message; the message can be captured in any format by the client application 600 for display on the communications device 105.

In exemplary embodiments, the son may enter his name and/or password at a log in screen 310 for personal messages. For example, there may be personal messages that are private, or the sender may not want to annoy others with messages that do not relate to them. When the son logs into the log in screen 310, a group of messages for the son may be displayed at a single time, and/or each message may be displayed separately at its designated time. The client application 600 and the server application 610 can communicate with one another to display the messages in accordance with any designations set by the user.

In accordance with the setting of, e.g., the mom, a display message screen 320 shows a message being displayed for the son at 3:30 p.m. and an audible alarm sounds to alert the son to the message. The son may select the OK button in accordance with the message (or once the task is complete).

Although the display screen 320 depicts the message in the center of the display screen 320, it is contemplated that the message may be in various locations, such as the top, the bottom, the left or right side, and/or the center. As a non-limiting example, the message may be viewed on the communications device 105 in a manner that is similar to picture-in-picture (PIP), or in any other suitable manner. Also, the message may be displayed in a streaming fashion, which may be similar to a ticker that runs across the communications device 105. Indeed, there is no limit in the manner in which the message may be displayed oil the communications device 105 for the viewer.

In exemplary embodiments, the messages may be set to display at designated times regardless if anyone logs into the log in screen 310. As a non-limiting example, the message may be for the husband but the son may have logged in or no one has logged in, and while the son is watching content on the IPTV, the message for the husband displays on the IPTV at the designated time. Since the son is able to view the message, the son can inform his father of the message. In other words, display of the messages is not limited to logging into the log in screen 310, according to exemplary embodiments.

Various non-limiting examples of screens are depicted in FIGS. 2 and 3 by way of illustration not limitation. It is understood that additional features may be added to the screens, screens may be placed in a different order, and/or the features of screens may be combined or omitted.

Figure 4:
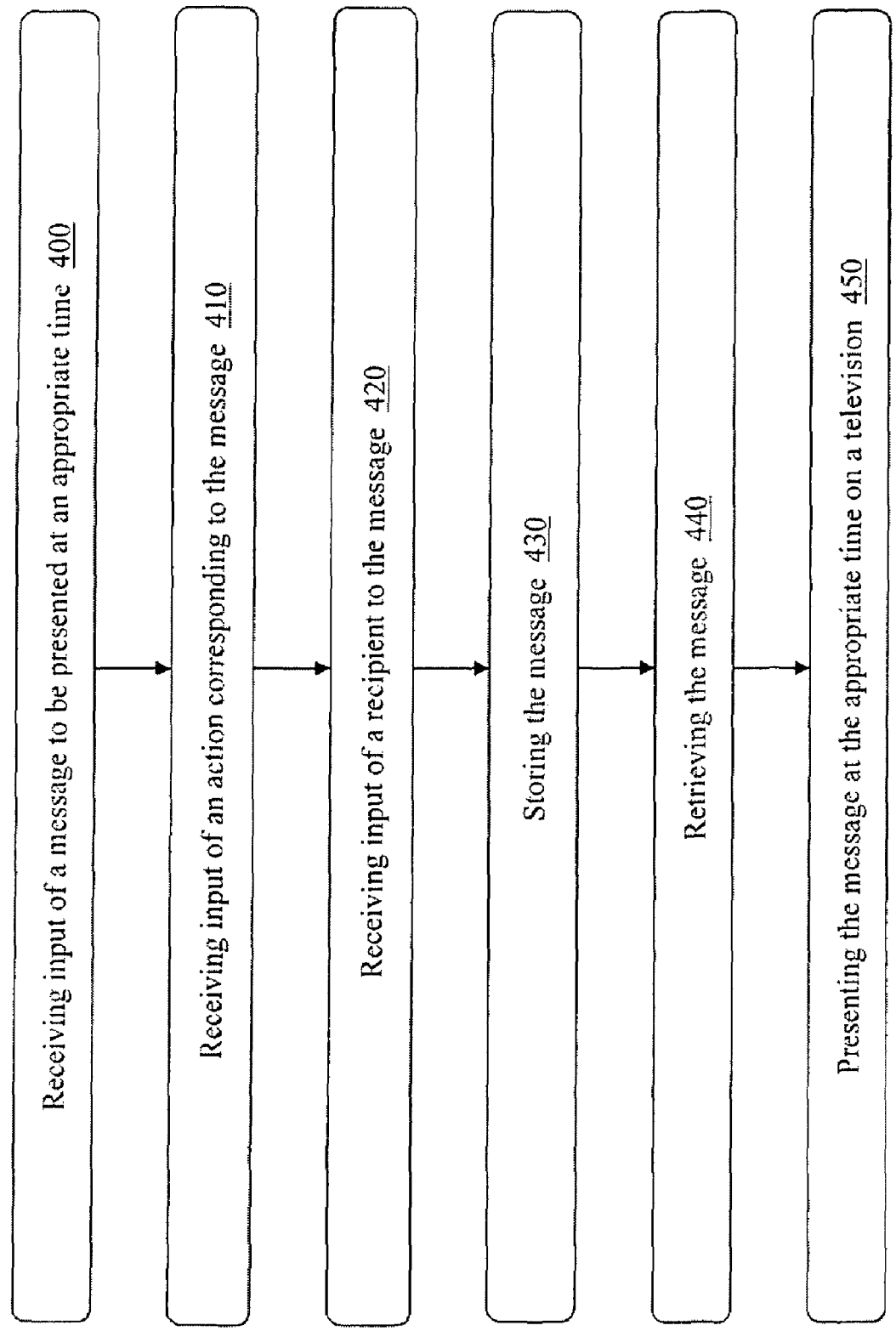
FIG. 4 illustrates a method for providing automatic messages on Internet protocol enabled televisions in accordance with exemplary embodiments.

FIG. 4 illustrates a method for providing automatic messages on Internet protocol enabled televisions (e.g., the communications device 105) in accordance with exemplary embodiments. Input (e.g., using the remote controller 115, the cell phone 140, the PDA 145, the personal computer 150, the camera 155, and/or the microphone 160) of a message to be presented at an appropriate time is received by the client application 600 at 400. Input of an action (to be executed by the execution application 605) corresponding to the message is received at 410.

Input of a recipient to the message is received by the client application 600 at 420. The message may be stored in the set top box 110, the server 130, and/or the storage 135 at 430.

In exemplary embodiments, the client application 600 may interact with the server application 610 to retrieve the message from the server 130 and, or the storage 135, or the client application 600 itself can retrieve the message from the set top box 110 at 440. The client application 600 can present the message to the recipient at the appropriate time on the IPTV device (e.g., the communications device 105) at 450.

In accordance with exemplary embodiments, the action corresponding to the message may cause the client application 600 to instruct the execution application 605 to enable or disable a device (such as the device 175), to enable or disable an application, to enable or disable capabilities of the communication device 105, to operatively connect to computing devices (such as the servers 170, 180 or the device 175), and/or to place a telephone call.

Input of a username and a password corresponding to a creator of the message may be received by the client application 600, such that the creator of the message is identified as the message is being presented on the IPTV device for the recipient. Similarly, input of a username and a password corresponding to the recipient of the messages may be received by the client application 600, so that the recipient can access messages (that may be private) for the recipient and so that others are restricted from accessing messages for the recipient.

Further, the recipient is not limited to being one person and the recipient can be multiple people. The message is not limited to being a single message but can be multiple messages, each having a different or the same designated time for presentation.

As discussed herein, the client application 600 interacts with the server application 610 to provide the automatic message service in accordance with exemplary embodiments. The interactions, protocols, and operations of client and server applications are well-known in the art.

Although for explanatory purposes the client application 600 and the execution application 605 are illustrated as two separate applications, it is understood that the capabilities of both applications may be implemented in a single application (e.g., the client application 600). Also, the capabilities of the client application 600 and the execution application 605 may be implemented in a plurality of applications and components.

Figure 5:
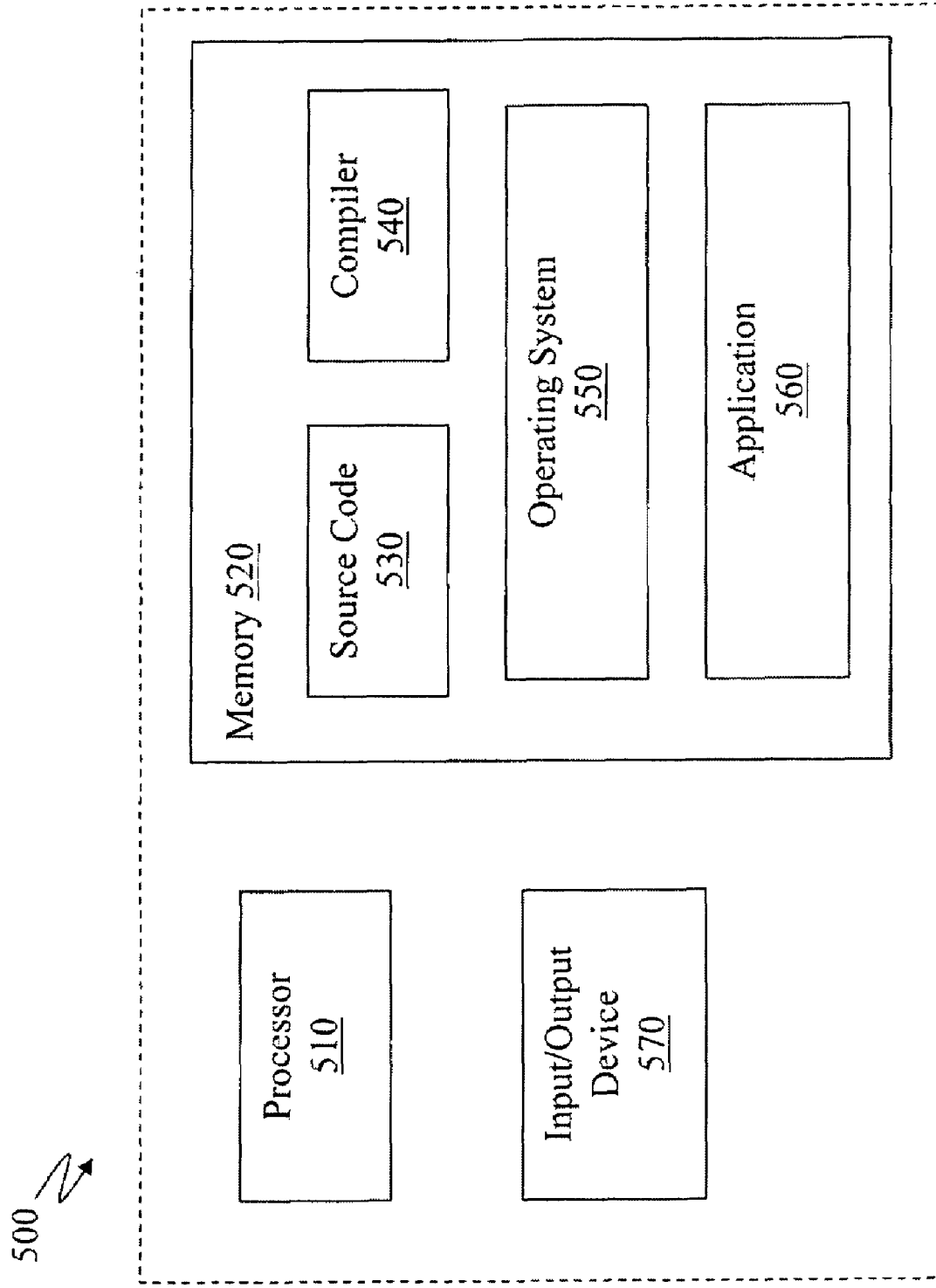
FIG. 5 illustrates an example of a computer in which exemplary embodiments may be implemented.

FIG. 5 illustrates an example of a computer 500 in which exemplary embodiments may be implemented. The above methods may also be implemented in the computer 500. The computer 500 includes, but is not limited to, PCs, workstations, laptops, PDAs, palm devices, Internet protocol enabled televisions (such as the communications device 105), set top boxes (such as the set top box 110), servers (such as the servers 130, 170, 180), and the like. Generally, in terms of hardware architecture, the computer 500 may include a processor 510, memory 520, and one or more input and/or output (I/O) devices 570 (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and nonvolatile memory elements (e.g. ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and application 560 (e.g., the client application 600, execution application 605, the server application 610, the order application 615, the payment application 620, the AAA software 625, the access application 630, and/or any other application for implementing exemplary embodiments) of the exemplary embodiments. As illustrated, the application 560 may comprise numerous functional components for implementing the features and operations of the exemplary embodiments.

The operating system 550 may control the execution of other computer programs and may provide scheduling, input-output control, file and data management, memory management, communication control, and related services. It is contemplated by the inventors that the application 560 for implementing automatic message services according to exemplary embodiments is applicable on all commercially available operating systems.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, PASCAL, BASIC, API calls, HTML. XHTML, XML, ASP scripts, FORTRAN, COBOL, PERL, JAVA, ADA, .NET, and the like.

The I/O devices 570 may include input devices such as, for example but not limited to, a mouse, keyboard, scanner, microphone, etc. Furthermore, the I/O devices 570 may also include output devices, for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, a universal serial bus (USB) device, etc. The I/O device 570 may comprise a modem or a transceiver for communicating over the network 120. Also, the computer 500 includes image, video, and audio software and hardware for receiving, recording, manipulating, and playing back images, video, and audio.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. An internet protocol television enabled communication device, being a set top box, that provides automatic message service, comprising:
    a processor for executing instructions from a memory; and
    a client application stored in the memory and configured to provide automatic message service;
    wherein the client application is configured to:
        receive by the set top box input of associating an action with a message;
        receive in a user interface of the set top box input of the message to be presented at an appropriate time on a television;
        receive by the set top box input of a recipient of the message;
        present by the set top box the message for display on the television to the recipient at the appropriate time; and
        execute the action associated with message;
    wherein in response to the client application on the set top box receiving input of a particular message having no action associated therewith, the client application on the set top box is configured to parse keywords of the particular message having no action associated therewith, determine a particular action based on parsing the keywords of the particular message, associate the particular action to the particular message; and execute the particular action in response to the recipient selecting affirmative to the particular message; and wherein the action associated with the message can cause the client application:
to enable and disable a device;
to enable and disable an application;
to enable and disable capabilities of the set top box;
to operatively connect to a computing device; and
to place a telephone call.

2. The communication device of claim 1, wherein the message for the recipient is stored on a storage; and
wherein the client application retrieves the message from the storage.

3. The communication device of claim 1, wherein the appropriate time is a time that the message is designated to be presented for display to the recipient.

4. The communication device of claim 1, wherein the client application communicates with a server application residing on a server to provide the automatic message service.

5. The communication device of claim 1, wherein the client application enables a creator of the message to log in using a username and a password; and
wherein the message presented for display to the recipient displays the creator of the message.

6. The communication device of claim 1, wherein the client application receives a username and a password input by the recipient such that the recipient can access restricted messages for the recipient; and
wherein the client application restricts others from accessing the restricted messages for the recipient.

7. A method for providing automatic message service on a set top box, comprising:
receiving by the set top box input of associating an action with a message;
receiving in a user interface of the set top box input of the message to be presented at an appropriate time on a television;
receiving by the set top box input of a recipient of the message; and
presenting by the set top box the message for display to the recipient at the appropriate time on the television;
wherein in response to a client application on the set top box receiving input of a particular message having no action associated therewith, the client application on the set top box is configured to parse keywords of the particular message having no action associated therewith, determine a particular action based on parsing the keywords of the particular message, associate the particular action to the particular message; and execute the particular action in response to the recipient selecting affirmative to the particular message; and
wherein the action associated with the message can cause the client application:
to enable and disable a device;
to enable and disable an application;
to enable and disable capabilities of the set top box;
to operatively connect to a computing device; and
to place a telephone call.

8. The method of claim 7, further comprising:
storing the message in a storage; and
retrieving the message from the storage.

9. The method of claim 7, wherein the client application residing on the set top box interacts with a server application residing on a server to provide the automatic message service.

10. The method of claim 7, further comprising receiving input of a username and a password corresponding to a creator of the message, such that the creator of the message is identified as the message is being presented for display to the recipient on the television.

11. The method of claim 7, further comprising receiving input of a username and a password corresponding to the recipient of the message, such that the recipient can access the message for the recipient, wherein others are restricted from accessing the message for the recipient.

12. The method of claim 7, wherein the appropriate time is a time that the message is designated to be presented for display to the recipient.

13. A computer program product, tangibly embodied on a non-transitory computer readable medium, for providing automatic message service for a set top box, the computer program product including instructions for causing the set top box to execute a method, comprising:
receiving by the set top box input of associating an action with a message;
receiving in a user interface of the set top box input of the message to be presented at an appropriate time on a television;
receiving input of a recipient of the message; and
presenting the message for display to the recipient at the appropriate time on the television;
wherein in response to the set top box receiving input of a particular message having no action associated therewith, instructions cause the set top box to parse keywords of the particular message having no action associated therewith, determine a particular action based on parsing the keywords of the particular message, associate the particular action to the particular message; and execute the particular action in response to the recipient selecting affirmative to the particular message; and
wherein instructions cause the set top box to enable a device, to disable the device, to enable an application, to disable the application, to enable capabilities of the set top box, to disable capabilities of the set top box, to operatively connect to a computing device, and to place a telephone call.

14. The computer program product of claim 13, further comprising instructions for causing the set top box to execute storing the message in a storage; and
retrieving the message from the storage.

15. The computer program product of claim 13, further comprising instructions for causing the set top box to execute receiving input of a username and a password corresponding to a creator of the message, such that the creator of the message is identified as the message is being presented for display to the recipient on the television.

16. The computer program product of claim 13, further comprising instructions for causing the set top box to execute receiving input of a username and a password corresponding to the recipient of the message, such that the recipient can access the message for the recipient, wherein others are restricted from accessing the message.

17. The computer program product of claim 13, wherein the appropriate time is a time that the message is designated to be presented for display to the recipient.

* * * * *